Dec. 27, 1966 B. F. FLODEN 3,294,302
MOTION PICTURE APPARATUS
Original Filed April 10, 1963 2 Sheets-Sheet 1
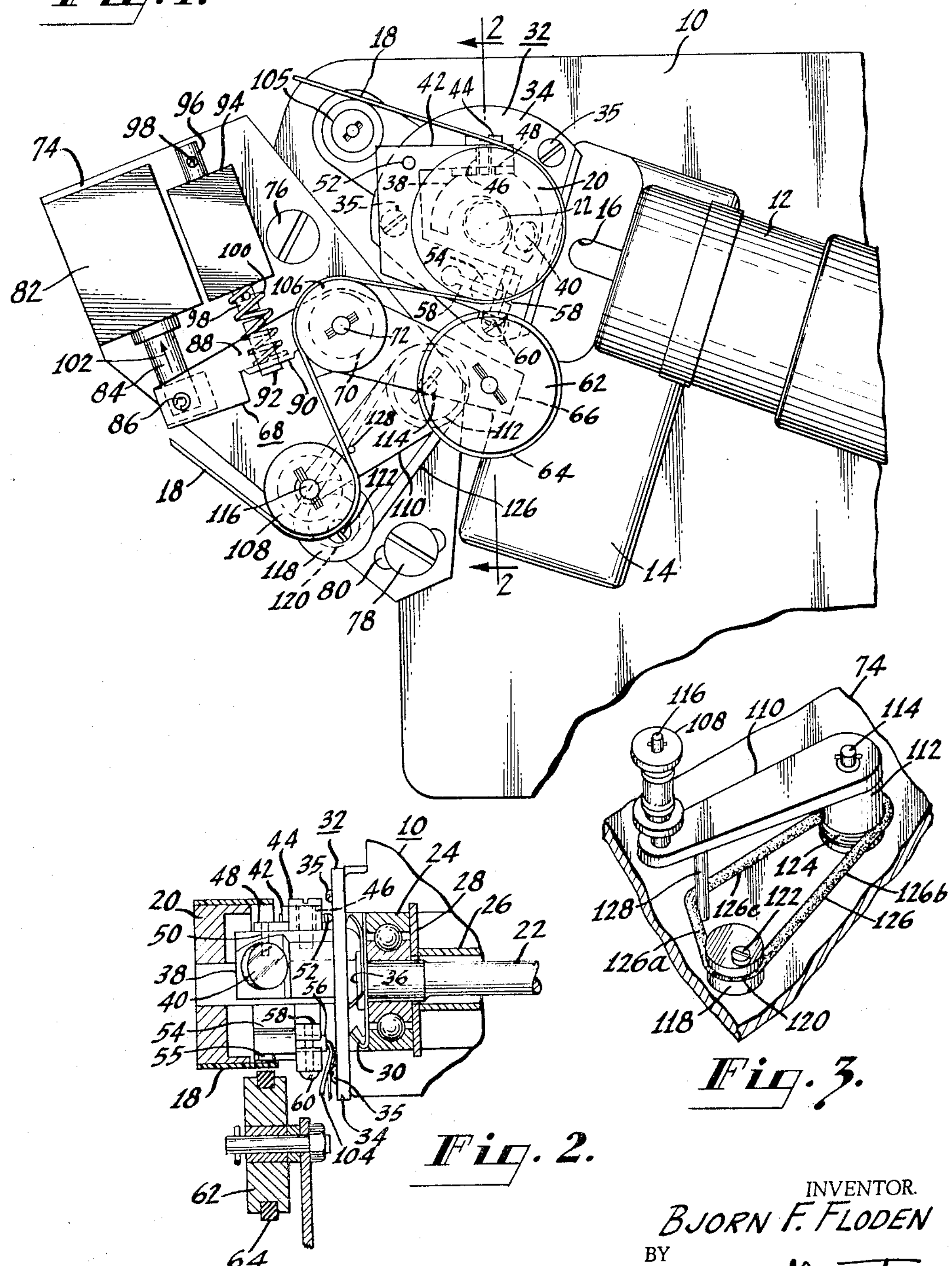
INVENTOR.
BJORN F. FLODEN
BY
Edward J. Norton
ATTORNEY

MOTION PICTURE APPARATUS

INVENTOR.
BJORN F. FLODEN
BY
Edward J. Norton
ATTORNEY

United States Patent Office 3,294,302
Patented Dec. 27, 1966

3,294,302

MOTION PICTURE APPARATUS

Bjorn F. Floden, Palmyra, N.J., assignor to Radio Corporation of America, a corporation of Delaware

Original application Apr. 10, 1963, Ser. No. 272,061. Divided and this application Nov. 26, 1965, Ser. No. 509,829

8 Claims. (Cl. 226—60)

This application is a division of the application of Bjorn F. Floden, Ser. No. 272,061, filing date April 10, 1963, for Motion Picture Apparatus.

The present invention relates to motion picture apparatus, and particularly to apparatus for handling and reproducing sound from motion picture film having either optical or magnetic sound tracks.

The invention may be used in an attachment for a motion picture projector which is designed to reproduce sound from optical sound tracks. The attachment also provides for reproducing sound from magnetic sound tracks. Some aspects of the invention are applicable to film handling generally, and the term "film," as used herein, is intended to include tapes, webs, and other reelable media, as well as films, when these film handling aspects of the invention are described.

In most motion picture projectors now on the market which have the feature of reproducing sound signals from either optical or magnetic sound tracks, a movable bracket is provided. This bracket carries the magnetic head or an opto-electric transducing element, say a mirror for reflecting light from the exciter lamp to the photoelectric cell element of the opto-electric transducer, or both. The bracket is rotated to place either the opto-electric transducer or the magnetic head in sound transducing relationship with the sound track on the film. The magnetic head should make positive contact with the magnetic sound track and be in alignment with that sound track for proper sound reproduction. After a period of use, the magnetic head sometimes becomes misaligned with the sound track. The moving parts of the assembly, including the magnetic head, may not always provide for the movement of the head into positive contact with the film because of wear in bearings and mechanical stops in the assembly, for example. The movable assembly also includes parts having relatively small mechanical tolerances and is expensive to construct and install. Servicing is also difficult since the principal parts of the movable assembly are hidden by the sound drum of the projector.

Any variations in the speed of that portion of the film which passes around the sound drum, that is, any deviation from uniformity on the motion of the film in the sound drum region of the projector, may produce distortion in the sound which is reproduced either optically or magnetically. Such distortion is principally of the type known as "flutter" and "wow." Mechanical filters and damping devices are used in the sound drum region of the projector for damping any deviation in the motion of the film which might cause speed variations resulting in "flutter" and "wow." Mechanical filters in the form of dashpots, damping springs, and the like have been used. Many of these filters occupy a relatively large amount of space and may be expensive to construct, install and service.

Accordingly, it is an object of the present invention to provide improved apparatus for reproducing sound signals from magnetic and optical sound tracks on motion picture film, in which apparatus the foregoing difficulties and disadvantages are overcome.

It is another object of the present invention to provide an improved device for reproducing the sound from a magnetic sound track on a motion picture film, which device may be aligned readily with the sound track and which is more rugged and less subject to becoming misaligned with the sound track than sound reproducing devices which have heretofore been available.

It is a further object of the present invention to provide an improved device for reproducing sound from either magnetic or optical sound tracks on motion picture film, as that film is shown through a motion picture projector, which device is simpler in construction, of lower cost, and more easily installed on the projector than sound reproducing devices which have been available heretofore.

It is a still further object of the present invention to provide improved apparatus for reproducing sound signals from sound tracks on motion picture film wherein variations from uniform motion of that portion of the film from which sound is being reproduced are reduced.

It is a still further object of the present invention to provide improved motion picture apparatus wherein a magnetic transducing element may readily be brought into proper cooperative relationship with a magnetic sound track.

It is a still further object of the present invention to provide, in a sound reproducing assembly for a motion picture projector having components for reproducing sound signals from either magnetic or optical sound tracks on motion picture film, an improved arrangement for reducing distortion of the reproduced sound due to irregularities of film motion, and also for providing an arrangement of sound reproducing and film motion irregularity reducing components which are in cooperative relationship with each other so as to facilitate installation adjustment and operation thereof.

It is a still further object of the present invention to provide an improved film motion filter which is reliable, compact, and simple to construct, install and service.

It is a still further object of the present invention to provide an improved mechanical film motion filter for reducing speed variations and other non-uniform motion of a film as it travels along a path, which filter has two modes of operation for effectively reducing larger and smaller deviations in uniform film motion.

The foregoing and other objects and advantages of the present invention may be provided in apparatus for handling film, such as motion picture film, and reproducing sound signals from either optical or magnetic tracks on such film. The film is adapted to be advanced around a member rotatable at constant speed, such as a sound drum. A magnetic transducer and an opto-electric transducer may be provided. A mirror may be provided for reflecting light from an exciter lamp, which light is modulated by the optical sound track, to a photoelectric device, which device is part of the opto-electric transducer and which device translates the reflected light into an electrical signal. The magnetic transducer and the opto-electric transducer element are mounted adjacent to the sound drum and to the sound track on the film. However, the magnetic transducer is normally disposed out of contact with the sound track. Means operative when magnetic track signals are to be reproduced (read) are provided for deflecting the film into intimate contact with the magnetic transducer. The deflecting means may be a pressure roller which is selectively movable into and out of engagement with that portion of the film which passes around the sound drum and which carries the sound track. The magnetic transducer and the opto-electric transducer element may be fixedly mounted in proper alignment with the sound track. Misalignment which might arise from movement of the magnetic transducer, as in previously known apparatus, when signals from magnetic sound tracks are reproduced is thereby avoided.

A mechanical filter for reducing variations from uniform motion, such as might produce speed variations of that portion of the film which passes around the sound drum, is disposed in cooperative relationship with the deflecting means and transducer elements of the apparatus and includes means having hysteresis and frictional damping characteristics. The hysteresis damping characteristics are effective for damping small variations in speed and deviations from uniformity of film motion, and the frictional characteristics are effective for damping relatively large variations from uniformity of film motion. The damping means of the filter may include a ring of resilient material, such as rubber, disposed around and in engagement with a fixed post. Film loop forming means disposed adjacent to the sound drum may be provided for flexing the ring in accordance with variations in the size of the loop, so as to utilize the hysteresis characteristics of the ring to oppose and damp small deviations from uniformity of film motion and for pulling the ring around the post so as to utilize frictional forces developed between the ring and the post to oppose and damp large variations from uniformity of film motion.

The invention itself, both as to its organization and method of operation, as well as additional objects and advantages thereof, will become more readily apparent from a reading of the following description in connection with the accompanying drawings, in which:

FIG. 1 is a fragmentary view, in side elevation, of a motion picture projector including sound reproducing apparatus embodying the invention;

FIG. 2 is a fragmentary view, partly in section, of the apparatus shown in FIG. 1, the view being taken along the line 2—2 in FIG. 1, and viewed in the direction of the appended arrows;

FIG. 3 is a fragmentary, perspective view of the mechanical filter mechanism of the apparatus shown in FIG. 1;

Figure 4:
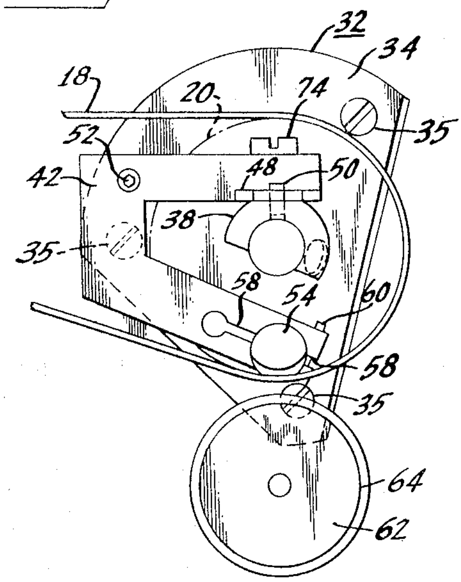
FIG. 4 is a partial elevation of the apparatus shown in FIG. 1, showing the magnetic head out of engagement with the film.
Figure 6:
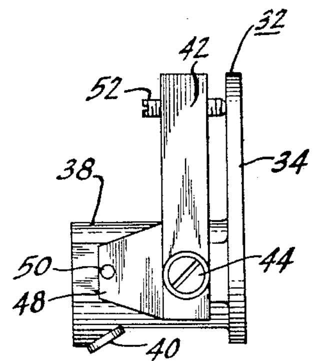
FIG. 6 is a plan view of the apparatus shown in FIG. 4.
Figure 7:
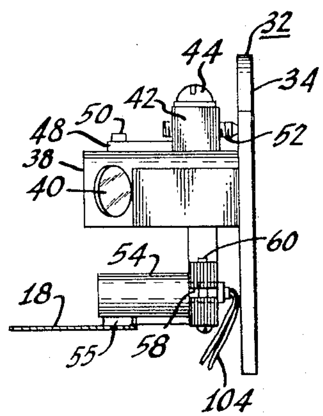
FIG. 7 is a rear elevational view of the apparatus shown in FIG. 6.

Referring more particularly to FIGS. 1, 2, 4, 6 and 7, there is shown a portion of the sound bracket of housing portion 10 of a motion picture projector, particularly the type TP–6 DL/DC, 16 MM. Television Film Projector, which is sold by Radio Corporation of America, Broadcast and Communications Division, Camden, New Jersey, and described in their instruction book, IB–36263–1. This housing portion 10 is a casting known as the "sound bracket" part of the projector and houses an exciter lamp and optical assembly 12 and a phototube assembly which is enclosed behind a cylindrical cover 14. An opening 16 in the cover 14 admits light to the phototube. The phototube, exciter lamp, and optical assembly are elements of an opto-electric transducer.

A motion picture film 18 is advanced around a rotatable cylindrical member known as the sound drum 20 and along a serpentine path through the sound bracket housing portion 10. The film is advanced by a drive sprocket which is below the sound bracket housing portion 10. Before reaching the sound bracket, the film passes through the gate of the projector and through an isolation loop (not shown). The gate, drive sprocket, and other parts of the projector are shown in detail in the above-referenced instruction book. The sound drum 20 is a cup-shaped, cylindrical member carried by a shaft 22 (FIG. 2) which passes through the sound bracket housing portion 10 and is journaled for rotation in two ball bearings 24, only one of which is shown in FIG. 2. A flywheel (not shown) is attached to the shaft 22 and provides for constant speed of rotation of the drum 20. A pressure roller (not shown) presses the film 18 againts the drum 20 so that the drum is advanced by the moving film 18. The ball bearings 24 are separated in properly spaced relation by a sleeve 26 surrounding the rear portion of the shaft 22. A retainer ring 28 is disposed against one end of the outer race of the ball bearing 24. The bearing 24 is pressed against the retainer ring 28 by a spring clamping washer 30. A bracket 32 having a circular flange 34, held on the sound bracket housing portion 10 around the sound drum shaft 22 by three screws 35, holds the spring clamping washer 30 in place against the outer race of the bearing 24. The sound drum shaft 22 is fitted tightly into the inner race of the bearing 24 and positioned thereagainst by a boss 36. Thus, axial meandering of the sound drum is prevented.

The bracket 32 has a C-shaped extension 38 (as viewed in FIG. 4) which extends axially along the sound drum shaft 22 to a position internally of the sound drum 20. A concave mirror 40 is carried on this extension and is positioned in cooperative relationship with the sound track of the film 18, the track overhanging the sound drum 20 by reason of the film sound track portion extending beyond that end of the drum 20 which faces the sound bracket housing portion 10. This mirror 40 (see FIGS. 6 and 7) is an element of the opto-electric transducer and serves to receive and reflect, into the opening 16 and to the phototube behind the cylindrical phototube assembly cover 14, light from the exciter lamp focussed onto the sound track by a suitable optical assembly. Instead of a mirror 40, the bracket 32 extension 38 may carry a photo-responsive device, which preferably is a semiconductor of the type known in the art as a "solar cell." When a solar cell is used, the phototube assembly is not required, since the solar cell translates the light from the exciter lamp which passes through the sound track directly into an electrical signal. The electrical signals produced either by the solar cell or by the phototube are amplified by means of an amplifier and may be reproduced by means of a loudspeaker. The amplifier is part of the projector described in the above-referenced instruction book.

Another bracket 42 which is substantially C-shaped is attached to the extension 38 of the mirror bracket 32 by a screw 44 which passes through a hole 46 in the upper leg of the bracket 42. The hole 46 has a larger diameter than the diameter of the screw 44. The bracket 42 has a lip 48 which extends in the direction axially of the sound drum shaft 22 along the extension 38 of the mirror bracket 32. A pin 50 extends through the lip 48 into the mirror bracket extension 38 and mounts the bracket 42 for pivotal motion limited by clearance between the hole 46 and the screw 44. The bracket 42 is pivoted by a preferably Allen headed screw 52 which passes through the upper arm of the bracket 42 and bears against the flange 34 of the mirror bracket 32. The screw may be turned by means of an Allen head wrench. Thus, the bracket 42 may be pivoted about the axis of the pin 50. This pin axis is perpendicular to the axis of the sound drum shaft 22 and the pin axis is centered over the sound track on that portion of the film 18 which overhangs the drum 20, for facilitating an azimuth adjustment, as will be explained hereinafter.

A magnetic head 54 is mounted on the lower leg of the C-shaped bracket 42. This head is shown as a cylindrical structure having a stem 56 (FIG. 2) which extends through a slot 58 in the lower leg of the bracket 42. The head 54 may be of known design having pole tips 55 in the lower surface thereof mounted in cooperative relationship with the sound track on that portion of the film 18 which overhangs the end of the sound drum 20. The magnetic head 54 and its pole tips 55 may be disposed out of contact with the film and its sound track, as shown in FIGS. 1 and 2. The slotted, lower leg of the bracket 42 clamps the stem 56 of the head 54. The slot 58 is recessed slightly to provide a seat for the stem 56 of the magnetic head 54. A screw 60 in the lower leg of the bracket 42 passes through the slot and is used to apply a desired clamping force to the stem 56 and thereby hold the head 54 in place.

The bracket 42 mounts the head in fixed position. The head may be adjusted so that the gap (not shown) in the head may be aligned with the sound track on the film 18. A tangency adjustment about an axis parallel to the axis of the sound drum may be made by loosening the clamp screw 60 and rotating the head about an axis parallel to the axis of the sound drum. This adjustment insures that a plane through the gap of the head will be perpendicular to the surface of the magnetic sound track when the film is brought into contact with the head, as will be explained hereinafter. The azimuth adjustment may be made by turning the screw 52 to pivot the entire bracket 42 so as to insure that the gap line of the head will be perpendicular to the magnetic sound track. Proper azimuth and tangency adjustments provide for maximum signal output from magnetic head 54.

The desired distance (e.g., .002–.001 in.) separating the sound track on the film 18 and the pole tips 55 of the magnetic head 54 is obtained by adjusting the vertical position of the mirror bracket 32 slightly on the sound bracket housing 10. The holes in the flange 34 of the mirror bracket through which the three screws 35 pass have sufficient clearance to provide for that adjustment.

A feeler gauge of the "clear-hit" type may be placed between the sound drum 20 and the head tips 55 for adjusting the vertical position of the mirror bracket 32, after which the screws 35 are tightened.

The apparatus shown in FIG. 1 normally is in condition for reproducing sound signals from the optical sound tracks on the film 18 and no movement of parts of the mechanism or the opto-electric transducer is required. The exciter lamp power supply and photocell amplifier are conditioned for operation by applying operating voltages thereto.

When magnetic sound track signals are to be reproduced, the film is deflected into contact with the pole tips 55 of the magnetic head by means of a pressure roller 62 having a rim or tire 64 of resilient material, such as soft rubber (FIGS. 1, 2, 4, and 5). This pressure roller is journaled for rotation on one arm 66 of a bellcrank lever 68. The lever 68 has a cylindrical collar 70 which is journaled on a shaft 72 mounted on a plate 74. Screws 76 and 78 respectively extending through a hole (not shown) and a slot 80 to attach the plate 74 to the sound bracket housing portion 10. The slot 80 permits adjustment of the plate 74 and the parts mounted thereon, particularly the pressure roller 62, with respect to the pole tips 55 of magnetic head 54. A solenoid 82 having an armature 84 is mounted on the plate 74. The armature is pivotally connected by means of a pin 86 to an arm 88 of the bellcrank 68. The arm 88 also has a tab 90 which depends therefrom toward the plate 74. A post 92 having its axis parallel to the surface of the plate 74 is secured on the tab 90. A block 94 is mounted on the plate 74 next to the solenoid 82 and has an axial bore therein. A rod 96 extends through this block bore with its axis approximately in alignment with the axis of the post 92. The rod 96 is slidably mounted in the block bore and is rotatable on its own axis within the block bore. Pins 98 through the rod 96 limit its axial movement. A coil spring 100 extends freely around the rod 96 and tightly around the post 92, as well as between the adjacent ends of the rod 96 and the post 92. One of the pins 98 passes between adjacent turns of the spring 100. The spring bears against the tab 90, clamps itself around the post 92, and is engaged by the lowermost pin 98. The tension in the spring may be adjusted by turning the rod 96 whereby to provide more or less turns of the spring between the tab 90 and the lowermost pin 98. The spring biases the bellcrank 68 in a counterclockwise direction about the axis of its shaft 72 and tends to bias to pressure roller 62 into contact with the film. The magnitude of the biasing forces applied by the spring may be adjusted by turning the rod 96 to adjust the tension in the spring 100.

Figure 5:
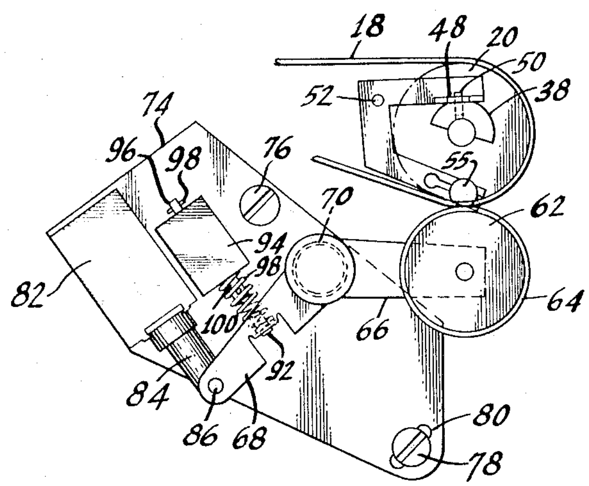
FIG. 5 is an elevational view of a selected portion of the projector of FIG. 1 showing the pressure roller mechanism when the pressure roller is engaging the film with the magnetic head and to a smaller scale than the showing in FIG. 4.

When optical sound tracks are to be reproduced, the solenoid 82 is energized and retracts its armature 84 in the direction indicated by the arrow 102 (FIG. 1). The bellcrank 68 is then rotated in a clockwise direction about the axis of the shaft 72 against the bias of the spring 100, and the pressure roller 62 is withdrawn out of contact with the film. When magnetic sound tracks are to be reproduced, the solenoid 82 is de-energized. The pressure roller 62 then moves under the bias of the spring 100 into contact with the film 18, as shown in FIG. 5. The sound track portion of the film is then deflected into contact with the pole tips 55 of the magnetic head 54. Since the solenoid is de-energized when magnetic sound tracks are reproduced, stray magnetic fields, generated by the solenoid and which might be picked up as noise by the magnetic head 54, are not set up by the solenoid 82. The lead wires 104 (FIG. 2) from the magnetic head 54 are connected to an amplifier for amplification of the signals transduced by the head; this amplifier then drives a loudspeaker for reproducing the sound track. It will be appreciated that the magnetic head may be used for recording signals on a magnetic sound track by applying to the head signals to be recorded together with suitable bias signals in known manner. Accordingly, magnetic recording, as well as reproducing functions may be provided.

An idler roller 106 is mounted for rotation on the same shaft 72 as the bellcrank 68. This idler roller may be flanged and may have rims which aid in guiding the film. The film 18 passes around an idler roller 105 before reaching the sound drum 20, and around the idler roller 106 after leaving the sound drum 20. An arm 110 is carried on a post 112 journaled for rotation on a shaft 114 extending from the plate 74. Another idler roller 108 is rotatably mounted on a rod 116 mounted on that end of the arm 110 which is remote from the post 112. Pins on the end of the shaft 114 and the rod 116 prevent the rollers and arm from moving axially off the shafts and rod on which they are respectively mounted. The roller 108 establishes a film loop between the sound drum 20 (over the idler 106) and a drive (sound) sprocket (not shown). This film loop varies in size with variations in uniform motion of the film. Such variations of small magnitude may be caused by imperfections in the sound sprocket and its drive mechanism, or by irregularities in the film, such as splices, as they run over the sound drum and the idlers 106 and 108. Variations of larger magnitude occur at the start of the projector and when loop restoring operations occur. If such variations in uniform film motion were allowed to affect the sound drum speed (and therefore the speed of that portion of the film that runs over the drum 20), signal distortions known as "flutter" and "wow" and "drift" would result. The idler roller 108, its arm 110 and the post 112 form part of a mechanical filter that absorbs variations in uniform film notion, thereby preventing too noticeable effects from small variations, and reducing the effects of larger variations in the loop size.

The other parts of this filter mechanism include a fixed post 118, which may be made of plastic material such as nylon or "Teflon." The post 118 has a peripheral groove 120. The post 118 is fixedly secured to the plate 74 by means of a screw 122 (see FIG. 3). The post 112 has a peripheral groove 124 of trapezoidal cross-section. An O ring 126 of resilient material having hysteresis characteristics, such as a soft rubber, is disposed around the fixed post 118 and the rotatable post 112, and is located in the grooves 122 and 124 in these posts. "Buna-N," a synthetic elastomer made from interpolymerization of butadiene with vinyl chloride, is an especially suitable material for the ring 126. The shape of the groove 124 tends to prevent slippage of the ring 126 on the post 112 while slippage is possible in the groove 120 in the post 118. A pin 128 is mounted on the arm 110 and extends downwardly to the plate 74 to a position within the confines or passes of the O ring 126. The resilient material of the O ring 126 has hysteresis characteristics, that is, the energy (or force) exerted to stretch the ring is partly absorbed (transferred to heat inside the material) and is not returned when the stretching force is lowered. In other words, the force delivered by the O ring as it springs back is lower than the force required to stretch it. The energy absorption is aided by external frictional energy absorption when the movement of the arm 110 exceeds a predetermined movement and a certain stretching tension in the belt is exceeded. Then, the O ring 126 slides around the fixed post 118 and, as the arm 110 moves clockwise, some of the O ring 126 is driven in one direction around the post 118. When the arm 110 moves in the other, counterclockwise direction, the O ring again slips, this time back around the fixed post 118.

The O ring and the fixed post 118 have a certain coefficient of sliding friction with respect to each other. When the O ring is stretched by the pin 128 to a point where the difference between the forces in the reaches 126*a* and 126*b* of the ring 126 exceeds the frictional retarding force exerted by the fixed post 118 against the O ring, the ring 126 slips. The frictional force continues to be exerted on the O ring, and this force opposes and damps the motion of the film.

During normal run operation, the tension in the film loop around roller 108 is mainly determined by the pull required to drive the sound drum-flywheel-pressure roller system. That normal film tension is exerted as a force upon the roller 108 and is balanced or reacted by the force applied to the roller 108 through the pin 128, due to the tension developed in the ring 126 as the arm 110 is displaced. The arm 110 and roller 108 of the film loop-filter system assumes a normal run position. The arm 110 pivots and the size of the loop around the roller 108 varies in response to variations from uniformity of film motion. These variations from uniformity tend to change the speed of the portion of the film that passes around the sound drum 20.

For small variations in speed, the loop size changes slightly, thereby tending to stretch or relax the O ring somewhat. Some of the energy of stretching and relaxation is absorbed by the O ring because of its hysteresis characteristics and non-uniformity in motion or speed of that portion of the film which passes around the sound drum 20 is diminished. For larger variations in film speed and larger deviations in the motion of the film from uniformity, the loop shortens or lengthens. When the loop is shortened, the pin 128 tends to stretch the O ring to an extent where the tension on the film exceeds the frictional retarding force exerted by the fixed post 118 on the O ring. The O ring then slips around the post 118. A frictional retarding force is then applied to the film which tends to damp any large film speed variations.

From the foregoing description, it will be apparent that there has been provided improved motion picture apparatus for handling film and reproducing sound tracks from motion picture film, whether the sound tracks thereon are of the optical or the magnetic variety. While a particular embodiment of the invention has been described herein for purposes of illustration, variations and modifications within the spirit of the present invention will, undoubtedly, become apparent to those skilled in the art. Accordingly, the foregoing description should be taken merely as illustrative and not in a limiting sense.

What is claimed is:

1. A mechanical filter for providing substantially uniform motion of a film which is to be driven at approximately constant speed along a path, said filter comprising, in combination, (a) a post,
(b) a body of resilient material having hysteresis characteristics disposed around said post, and
(c) means disposed along said path for engagement with said film and coupled to said body for stretching said body and sliding said body over said post so as to absorb the energy of non-uniform motion of the film, thereby to oppose deviations in the motion of said film from uniform motion.

2. In combination, (a) a rotatable member for moving a film along a path with approximately uniform motion,
(b) a post,
(c) a ring of resilient material around said post, and
(d) means movable with a portion of said film leaving said rotatable member for flexing said ring for opposing the small variations from uniformity of motion of said portion and for sliding said ring over said post for developing frictional forces which oppose large variations from uniformity of motion of said portion.

3. In combination, (a) a rotatable member around which a film is adapted to be advanced with uniform motion along a path,
(b) a pair of spaced posts having circular grooves therein,
(c) a rubber ring around said posts and in said grooves, one of said posts being rotatable and the other of said posts being fixed,
(d) an arm mounted on said rotatable posts for rotation therewith,
(e) an idler roller on said arm around which said film is adapted to pass and defining a loop in said path, and
(f) a pin extending from said arm to a position within said ring for engaging said ring and stretching said ring in response to variations in the motion of said film, said ring slipping around said fixed post when the tension therein exceeds a certain tension, said variations in motion being opposed by hysteresis losses in the stretching of said ring and frictional forces set up in said ring by said pin as said pin moves with said arm and said roller.

4. A film drive filter cooperative with a film which is adapted to travel along a path comprising (a) means disposed along said path for forming a loop of said film, which loop is subject to changes in size with variations in the motion of said film, said means being movable in response to said changes in size of said loop,
(b) a pair of parallel posts spaced from each other,
(c) a ring of resilient material extending around said posts in engagement therewith and adapted to stretch and slide relative to one of said posts, and
(d) means coupling said first named means and said ring for flexing said ring and opposing and damping movement of said first named means whereby to filter variations in the movement of said film which produces said changes in size of said loop.

5. A film drive filter cooperative with a film which is adapted to travel along a path comprising (a) a roller disposed along said path and around which said film is adapted to pass,
(b) an arm supporting said roller on one end of said arm,
(c) a rotatable post on which the opposite end of said arm is mounted,
(d) a fixed post spaced from said rotatable post,
(e) a ring of resilient material extending around said fixed and rotatable posts and engaging said posts, and
(f) a pin extending from said arm to a position within the confines of said ring and movable with said arm, said ring opposing and damping movement of said arm whereby to filter variations in the movement of said film which produce movement of said arm.

6. The invention in accordance with claim 5 in which said ring is composed of soft rubber having hysteresis characteristics.

7. A film drive filter cooperative with a film which is adapted to travel along a path, comprising, a roller disposed along said path and around which said film is adapted to pass, an arm supporting said roller at one end of said roller, a rotatable post having a groove in the periphery thereof, said arm being mounted on an end of said post, a fixed post having a groove in the periphery thereof and spaced from said rotatable post, a ring of resilient material having hysteresis characteristics extending around said fixed and rotatable posts and engaging the groove portions of said posts, said groove of said rotatable post being shaped to tend to prevent slipping of said ring with respect to said rotatable post, said groove of said fixed post being shaped to permit slipping of said ring with respect to said fixed post, and a pin extending from said arm to a position within the confines of said ring and movable with said arm to engage said ring, said ring opposing and damping movement of said arm whereby to filter variations in the movement of said film which produce movement of said arm.

8. The invention as expressed in claim 7 in which said ring is composed of a synthetic elastomer made by the interpolymerization of butadiene with vinyl chloride.

References Cited by the Examiner

UNITED STATES PATENTS

| | | | |
|---|---|---|---|
| 1,892,554 | 12/1932 | Kellogg. | |
| 2,082,456 | 6/1937 | Liedtke et al. | 226—60 |
| 2,499,210 | 2/1950 | Bartelson | 226—60 |
| 2,669,452 | 2/1954 | White | 226—60 |
| 2,796,009 | 6/1957 | Doyle et al. | 352—166 X |

M. HENSON WOOD, Jr., *Primary Examiner.*

J. N. ERLICH, *Assistant Examiner.*